United States Patent [19]

Goossen

[11] Patent Number: 4,913,943

[45] Date of Patent: Apr. 3, 1990

[54] DAMPENER ROLL COVER AND METHODS OF PREPARATION AND USE THEREOF

[75] Inventor: Charles G. Goossen, Hudson, Wis.

[73] Assignee: Minnesota Mining and Manufacturing Company, St. Paul, Minn.

[21] Appl. No.: 252,012

[22] Filed: Sep. 27, 1988

Related U.S. Application Data

[63] Continuation of Ser. No. 796,953, Nov. 12, 1985, abandoned.

[51] Int. Cl.[4] .......................... B21B 31/08; B60B 7/02

[52] U.S. Cl. .................................. 428/36.1; 29/129.5; 29/131; 29/132; 101/148; 428/224; 428/338; 428/373; 428/284; 428/288

[58] Field of Search ............... 101/148; 29/129.5, 131, 29/132; 428/36.1, 224, 286, 338

[56] References Cited

U.S. PATENT DOCUMENTS

| | | | |
|---|---|---|---|
| 3,229,351 | 1/1966 | Peterson et al. | 101/148 |
| 3,242,554 | 3/1966 | Raymond | 101/148 |
| 3,273,224 | 9/1966 | Spicer | 101/148 |
| 3,293,097 | 12/1966 | Peterson et al. | 101/148 |
| 3,853,677 | 12/1974 | Kai | 29/131 |
| 3,926,701 | 12/1975 | Nishiwaki | 101/148 |
| 4,337,328 | 6/1982 | Holst et al. | 525/329.1 |
| 4,339,858 | 7/1982 | Peterson | 29/131 |
| 4,535,131 | 8/1985 | Handa et al. | 525/378 |

*Primary Examiner*—James J. Seidleck

*Attorney, Agent, or Firm*—Donald M. Sell; Walter N. Kirn; Gerald F. Chernivec

[57] ABSTRACT

A cylindrical sleeve of non-woven web material comprised of partially hydrolyzed acrylic fibers useful as a dampener roll cover in lithographic printing is provided. The sleeve has excellent strength as well as improved water absorption. Methods of preparing the sleeve and of using the sleeve in lithographic printing are also provided.

7 Claims, 1 Drawing Sheet

DAMPENER ROLL COVER AND METHODS OF PREPARATION AND USE THEREOF

This is a continuation of application Ser. No. 796,953 filed Nov. 12, 1985, now abandoned.

TECHNICAL FIELD

This invention relates to covers for dampener rolls used in printing, particularly lithography. More particularly, this invention relates to a cylindrical sleeve of non-woven web material having a particular fiber as part of the web. This invention also relates to a method of preparing a cylindrical sleeve having improved properties when used as a dampener roll cover.

BACKGROUND ART

Lithographic printing entails applying aqueous dampening solutions to a printing plate to cover the background areas of the plate followed by application of oil-based inks to those areas of the plate which are to serve as the image areas. As will be better understood from the following detailed description of the invention, the aqueous solutions are generally transmitted from a source to the printing plate by a train or a series of rolls, including a ductor roll and a water form roll. The object is to apply a uniform, continuous, clean ample film of aqueous solution to the background areas of the printing plate over the duration of the printing cycle in as economical and efficient a manner as possible. There are several hurdles to overcome in achieving this multifaceted objective, which involves many inherently antagonistic demands.

The demand for efficiency and economy begins with providing a replaceable surface for a dampener roll, as an integral roll would generally be too costly. The replaceable surface, in the form of a roll cover, should be dimensioned to be readily applied to the roll, and thereafter be capable of fitting snugly on the roll in the presence of rotational and other distortional forces generated during operation. This fitting and gripping problem has been addressed in the prior art, typical of which is the discussion in U.S. Pat. No. 3,180,115. In this patent, roll covers incorporating elastic yarns are described to obviate the shortcomings of the many secondary anchoring means such as adhesives, end-ties and the like which have been previously adopted. A related improvement in elastic dampener roll covers is described in U.S. Pat. No. 4,043,142 wherein a knit fabric is used that reduces the tendency of the fabric to produce a pattern in the printed copy.

A continuous, uniform aqueous dampening film is essential to achieving quality printing. Discontinuities or patterns in the film can be caused by irregularities in the cover surface, resulting from the basic design of the cover (e.g., see the discussion in U.S. Pat. No. 4,043,042 of the elastic cover which is the subject of U.S. Pat. No. 3,180,115) or from distortion or wear of the cover during use. Thus, the cover must be free of inherent irregularities in initial design and have uniform wearing qualities to preclude introducing irregularities in use. Additionally, the cover should have sufficient structural integrity to withstand distortive forces generated in use. Roll covers composed of napped, loosely woven cotton material called molleton present problems in nonuniformity due to the presence of the napped fibers. The fibers tend to compress with time necessitating a breakin period to reach a steady state where uniformity is achievable.

Insofar as providing a clean dampening film there are at least two considerations in the selection of a dampener roll cover. First, the roll cover may be a source of contaminants in the form of lint or loosened fibers. Deposition of lint or loose fibers on the printing plate in the course of dampening application interferes with the subsequent application of ink to the plate and results in a loss in print quality. The second consideration involves contamination of the roll cover with ink, and the ability to remove the ink from the cover. After a period of press operation, a slight, but significant, amount of ink works its way back on the fountain train and deposits itself on the ductor roll cover. The ease with which the roll covering may be cleaned of ink is thus an important criterion in measuring the utility of the cover. For example, when a molleton roll becomes dirty with ink residue, the entire roller assembly must be disengaged and the surface scoured in a separate cleaning bath. The removal and substitution of molleton covers must also take place when changing the color of the ink as is frequently required on single color presses. The covering that is the subject of this invention can be cleaned on press and does not require substituting for changes in the color of the ink.

U.S. Pat. Nos. 3,229,351 and 3,293,097 disclose dampening roll covers comprised of a seamless, cohesive, porous, hydroscopic, non-woven cylindrical sleeve having a uniform surface texture, the sleeve being comprised of hydrophilic, randomly disposed fibers which have certain characteristics of solubility, elongation, and dimensional stability when dry. Examples of such fibers include polyvinyl alcohol (PVA) fibers, polypyrrolidone, rayons, cotton, partially saponified cellulose acetate fibers, and the like. As the ratio of fusible binder fiber or resin (e.g., PVA) to hydrophilic fibers (e.g., rayon) is increased, the strength of the sleeve is increased, but the water holding capacity and permeability decrease. Covers made from these fibers function well as dampening (form) roll covers but have insufficient water holding capacity and permeability for use as a ductor roll cover when formulated to have sufficient strength to maintain their structural integrity over long periods of use.

The ability to provide an ample quantity of aqueous dampening solution relates to the liquid retention properties of the roll cover. Even though the actual source of liquid is contained in the fountain tray, the degree of control for wetting the background surface of the printing plate resides in the effective functioning of the ductor roll. For this reason, a covering for the roll must have the ability of absorb moisture from the fountain roll, to retain sufficient moisture to satisfy the demand and to release controlled amounts of fluid so that the water form roll is sufficiently supplied.

U.S. Pat. No. 4,339,858 discloses a cover for a dampening roll having the above-noted characteristics comprised of a cylindrical shaped article of substantially uniform cross-sectional dimension having inner and outer concentrically positioned layers, the inner layer comprising a water wickable textile fabric and the outer layer comprising a porous, smooth, continuous-surfaced, water-permeable, hygroscopic, cohesive, nonwoven member of hydrophilic randomly disposed fibers, bonding means for bonding the inner layer to said outer layer along the interface of the inner and outer layers, the cylindrical article having a first radial dimension when dry, a second radial dimension when wetted in the presence of a radially expansive force, the second radial dimension being greater than the first radial dimension, the article being capable of retaining the second radial dimension upon drying, and a third radial dimension upon rewetting, the third radial dimension being smaller than the second radial dimension. The textile fabric of the inner layer is relatively costly, and its use causes excessive migration of the PVA binder during forming, which results in decreased strength of the outer layer.

SUMMARY OF THE INVENTION

This invention relates to a sleeve of non-woven web material comprised of partially hydrolyzed acrylic fibers. Use of the partially hydrolyzed acrylic fibers provides increased strength, water absorption, and permeability to the sleeve.

This invention also relates to a composite cylindrical sleeve comprised of at least one inner layer and at least one outer layer wherein said inner layer consists of a non-woven web material comprised of partially hydrolyzed acrylic fibers.

This invention also relates to a method of preparing a sleeve as described above comprising:

(a) soaking a non-woven web comprised of partially hydrolyzed acrylic fibers in water, (b) wrapping the soaked web about a cylindrical substrate, securing the wrapped web under tension in the circumferential length, (c) subjecting the wrapped web to heat and pressure sufficient to form a durable sleeve.

This invention also relates to a method of lithographic printing comprising using the cylindrical sleeve described above to transfer water used in the method of printing.

BRIEF DESCRIPTION OF THE DRAWINGS

Further explanation of the invention is provided by reference to the accompanying drawings wherein.

DETAILED DESCRIPTION

Figure 1:
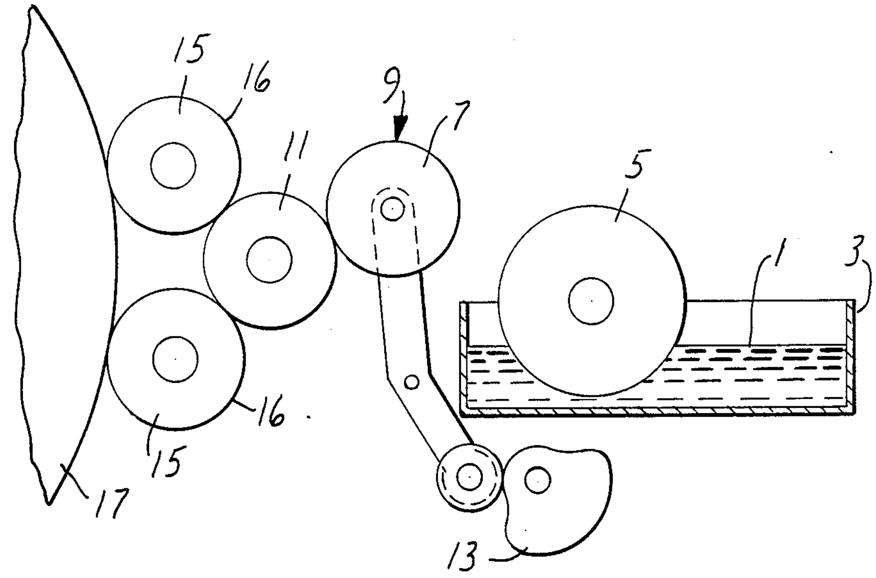
FIG. 1 is a schematic diagram showing the dampening system in a typical lithographic printing press.

Referring to FIG. 1, in a typical dampening train, aqueous dampener solution or fluid 1 contained in tray 3 is picked up by fountain roll 5 and transferred to ductor roll 7 equipped with cover 9 by momentary contact between roll 5 and roll 7. Reciprocal movement of ductor roll 7 between fountain roll 5 and vibrator roll 11 is controlled by camming mechanism 13. Aqueous dampening fluid is transferred from the cover 9 of ductor roll 7 to vibrator roll 11, thence to water form rolls 15 equipped with covers 16 and finally to the surface of printing plate 17.

Figure 2:
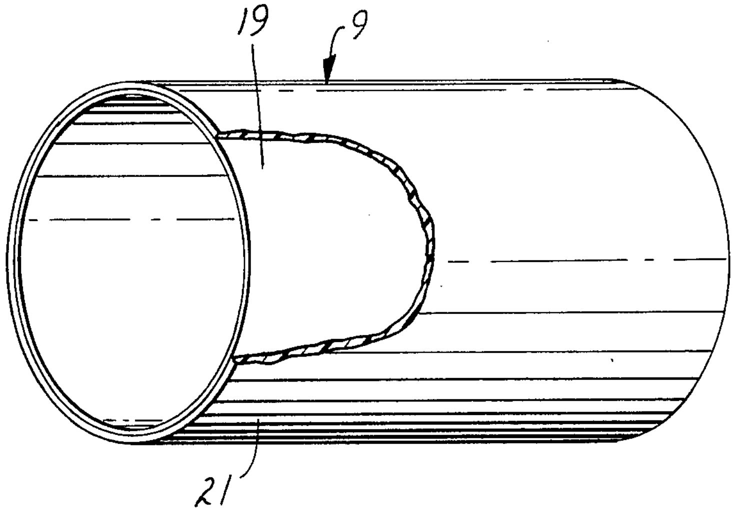
FIG. 2 is a perspective view of a composite roll cover of the present invention with portions removed to show underlying structure.

FIG. 2 illustrates details of a composite roll cover 9. It comprises inner layer 19 of non-woven material comprised of a partially hydrolyzed acrylic fiber and outer concentric layer 21 of non-woven material comprised of polyvinyl alcohol.

An acrylic fiber is known in the art as a manufactured fiber in which the fiber forming substance is any long chain synthetic polymer comprised of at least 85% by weight of acrylonitrile units. The partially hydrolyzed acrylic fibers of this invention are preferably less than 50% by volume hydrolyzed, more preferably 25% by volume hydrolyzed. The fibers are preferably core-sheath hydrolyzed acrylic fibers such as Lanseal-F available from Japan Exlan Co., Ltd. Core-sheath fibers are prepared by hydrolyzing a polyacrylonitrile fiber such that the fiber sheath is polyacrylate and the core is polyacrylonitrile. These fibers are described as "superabsorbent" fibers. We have discovered an unexpected property of these fibers. When blended with other fibers in the proper ratios and processed under the proper forming conditions, these fibers not only increase water holding capacity but also function as a binder to increase the strength of the sleeve. It has been found from photo-micrographs of sleeves of this invention that the hydrolyzed portion of the acrylic fibers soften sufficiently during processing to allow some of the polymeric material of the fiber to flow and form a bond between adjacent hydrolyzed acrylic fiber and other fibers of the non-woven web.

The non-woven web useful in this invention preferably contains only a minor amount of the hydrolyzed acrylic fiber and a major amount of other hydrophilic fibers which may or may not be binder fibers. For example, a web comprised of from about 10 to about 50% by weight hydrolyzed acrylic fibers with the remainder being rayon or a blend of rayon and polyvinyl alcohol is preferred.

A particularly preferred class of other binder fibers for the non-woven web are the polyvinyl alcohol fibers, especially those polyvinyl alcohol fibers with a denier of from about 0.5 to about 6 and an individual average fiber length of from 0.5 cm to about 6.cm (preferably 1 cm to 4 cm). Polyvinyl alcohol fibers are available in various grades, depending on their solubility characteristics in hot water. The use of polyvinyl alcohol fibers improves the abrasion resistance of the roll cover and the use of higher percentages (25–50%) of polyvinyl alcohol fibers may be required for roll covers subjected to highly abrasive forces. Other useful heat fusible fibers, i.e., fibers capable of being cohered or bonded to each other upon application of heat and pressure with or without the presence of moisture, include the polypyrrolidone fibers.

In general, the inclusion of additional hydrophilic fibers, not necessarily heat fusible, in the non-woven web is preferred. Cellulosic fibers such as cotton, regenerated cellulose, viscose rayon, cellulose acetate rayon and other rayons may thus also be incorporated to modify the properties of the non-woven web and hence of the sleeve, e.g., to increase strength and hydrogroscopic properties. Saponified cellulose acetate fibers, particularly those in which cellulose acetate fibers are saponified in their oriented condition during manufacture and have a denier from about 0.5 to about 3 and an average fiber length of from about 0.64 cm to about 5.1 cm (preferably 1.3 cm to 3.81 cm), in combination with up to 40 weight percent hydrolyzed acrylic fibers provide a non-woven material having outstanding properties when used as a dampening roll cover in accordance with this invention.

It has been found that the sleeves of this invention which contain no polyvinyl alcohol (PVA), while having improved tensile strength and water absorption compared with sleeves formed from non-woven blends of PVA and rayon, have reduced abrasion resistance compared with these sleeves. Accordingly, the sleeves of this invention without PVA fibers should be used only on dampener rolls whose covers are exposed to moderate or low abrasive forces, e.g., slow speed offset printing presses.

In a different embodiment shown in FIG. 2, the sleeve of this invention is used as an inner layer of a composite cover which has excellent tensile strength and water absorption in connection with an outer layer of PVA and rayon which has excellent resistance to abrasion. In particular, the sleeves of this invention can be used in place of the inner knit layer of the composite sleeves described in U.S. Pat. No. 4,339,858. Sleeves comprised of a sleeve of this invention as an inner layer and a high-abrasion sleeve as an outer layer are particularly useful as ductor roll covers which encounter highly abrasive forces.

The non-woven material is generally described in terms of method of manufacture in U.S. Pat. Nos. 3,293,097 and 3,229,351 incorporated herein by reference. These patents disclose the use of non-woven fibers that can be processed in a novel fashion for use as dampening roll covers. As mentioned previously, the form roll cover described in these patents would find marginal utility in the ductor position on lithographic presses because of the lack of water carrying capacity.

In the preferred forming method, a non-woven web consisting of a blend of rayon, polyvinyl alcohol fiber, and core-sheath hydrolyzed acrylic fiber is made by an air-laid process (or by cross-lapping carded webs). Handling strength of this non-woven web may be improved by needle-punching or by applying a very dilute aqueous solution of polyvinyl alcohol resin and drying in an oven. These treatments do not affect the characteristics of the formed sleeve.

This web is saturated with water or a weak aqueous acid and formed, i.e., wrapped in several layers, around a cylindrical metal mandrel. Acidifying the saturating water to a pH of 3–4 can be beneficial to the handling strength of the non-woven web by temporarily reducing the water adsorption of the hydrolyzed acrylic fiber. Following forming, the water adsorbancy can be re-established by neutralizing the sleeve with a weak aqueous base.

The non-woven web on the mandrel is wrapped with a wet woven tape under tension, to subject the fiber to substantial radial compression. Preferably, the tension should be sufficient to compress the several layers to about 20 percent of their original combined thickness. The wrapped web is then subjected to heat sufficient to cause the acrylic fibers to bond to the desired extent. The sleeve temperature should rise to at least about 105° C. while it is still moist for acceptable bonding. Depending on the heating method and temperature, the heating period can be as short as several minutes to as long as one hour. Following tape removal, the sleeve is sanded to remove tape marks, removed from the mandrel, soaked in water or a weak aqueous base, and then expanded and dried.

As described in U.S. Pat. No. 3,229,351, cover 9 constitutes a seamless, cohesive, porous, hygroscopic, non-woven, cylindrical structure having a uniform surface texture. The fibers are preferably comprised of hydrophilic, randomly disposed fibers which (1) are substantially water insoluble at temperatures below about 100° F., preferably below 170° F., (2) can be longitudinally expanded, preferably at least 3%, when water wetted, (3) have dimensional stability when dry, and (4) longitudinally contract from their expanded state when water wetted.

The non-woven web may be composed of a single or multiple layer of non-woven material. By using a hydrophilic fiber and/or a resin which is heat fusible or heat and moisture fusible in conjunction with other hydrophilic fibers in the non-woven web, several layers of the web may be bonded together by the application of either heat alone or heat and moisture while subjecting the several layers to pressure in a suitable device. The particular conditions of heat, moisture and pressure depend, of course, on the fibers or resins employed.

It has been found that the use of low levels of the preferred hydrolyzed acrylic fiber, Lanseal-F, along with polyvinyl alcohol fibers in a single non-woven web has resulted in sleeves with up to 50% higher water absorption and equal strength compared to comparable sleeves without Lanseal-F.

In a composite sleeve application, the use of Lanseal-F in a non-woven web as a substitute for the textile fabric inner layer disclosed in U.S. Pat. No. 4,339,858 has resulted in sleeves with up to twice the water absorption, equal holding force, and twice the abrasion resistance.

EXAMPLES

Test Procedures

Two bench tests are valid as screening tools to determine the suitability of a formed sleeve for a dampening cover:

Water absorption—A dry sample is weighed, immersed in water for 30 seconds, blotted on a damp sponge, and reweighed. The water absorption is reported as a percentage of the dry weight. Experience has shown as that water pickups of 40–75% are suitable for dampening (form) sleeves and pickups of over 75% are suitable for a ductor sleeve or its internal "reservoir". This test is described in U.S. Pat. No. 4,339,858, incorporated herein by reference.

Force at 5% elongation—A sample strip of uniform dimensions (1"×6") is cut from the "around cylinder" direction and weighed dry. The sample is wet thoroughly, clamped in a tensile tester, and subjected to a tensile strain rate of 5% per minute. The force at 5% elongation is normalized to a dry sleeve basis weight of 300 g/m². Our experience indicates that the formed sleeve should have "5% Force" of at least about 17N/cm if it is to be used as a one-piece sleeve. If it is to be laminated to a stronger backing in the forming process, it should have a "5% Force" of at least about 13N/cm to withstand shear forces during use.

Fibers

The acrylic fibers were Lanseal-F fibers available from Japan Exlan Co., Ltd. The Lanseal-F fibers of Examples 1, 3, 5, 7, 9 and 11 were 7d×56 mm and those of Examples 2, 4, 6, 8, 10, 12, 13, 14 and 15 were 2.6 d×35 mm. The rayon fibers, available from American Enka as F700 were 1.5 d×35 mm and the polyvinylalcohol (PVA) fibers, available from Kurashiki Rayon Co. as Kuralon VPB 101 were 1.5 d×35 mm as well.

Examples 1-8 and Comparative Examples A-D

The following first set of examples was made by wetting the non-woven fiber backings with 1% acetic acid and wrapping on a 51.3 mm diameter hollow mandrel. The backing was wrapped with wet woven nylon tape with tension sufficient to apply a normal pressure of 122 kPa. A thermocouple was inserted during wrapping. A Scotchpak bag was taped around the mandrel (to keep the sleeve wet), and the mandrel was inserted in an oven at a set temperature. After the thermocouple had indicated temperature stabilization for at least two hours, the bag was removed, and the sleeve was allowed to dry at the set temperature for at least one hour.

| Ex. | Fiber Blend (wt. %) Acrylic | Rayon | PVA | Fusion Temp. (°C.) | Water Absorption (% at 30 sec.) | Force at 5% Elong. (N/cm) | Apparent density (g/cm$^3$) |
|---|---|---|---|---|---|---|---|
| 1 | 30 | 70 | — | 74 | 327 | 4.6 | 0.43 |
| 2 | 40 | 60 | — | 74 | 259 | 6.8 | 0.38 |
| A | — | 54 | 46 | 74 | 160 | 3.2 | 0.47 |
| 3 | 30 | 70 | — | 82 | 310 | 5.6 | 0.38 |
| 4 | 40 | 60 | — | 82 | 213 | 8.1 | 0.42 |
| B | — | 54 | 46 | 82 | 157 | 3.9 | 0.50 |
| 5 | 30 | 70 | — | 93 | 295 | 7.7 | 0.39 |
| 6 | 40 | 60 | — | 93 | 186 | 12.3 | 0.42 |
| C | — | 54 | 46 | 93 | 107 | 7.4 | 0.63 |
| 7 | 30 | 70 | — | 99 | 296 | 9.1 | 0.38 |
| 8 | 40 | 60 | — | 99 | 165 | 10.2 | 0.43 |
| D | — | 54 | 46 | 99 | 52 | 13.0 | — |

The results of the above tests illustrate that Lanseal starts bonding at a lower temperature than PVA, but bonding efficiency increases less with temperature than PVA.

Examples 9 and 10 and Comparative Example E

The following is a slightly different forming method. After winding the wet backing with tape to give a normal pressure of 122 kPa, steam was run through the hollow mandrel for ten minutes. Due to a mandrel leak, the maximum steam temperature was about 115° C., and the maximum sleeve temperature was about 98° C.

| Ex. | Fiber Blend (wt. %) Lanseal | Rayon | PVA | 30″ Water Absorption (% at 30 sec.) | Force at 5% Elongation (N/cm) | Apparent Density (g/cm$^3$) |
|---|---|---|---|---|---|---|
| 9 | 30 | 70 | — | 302 | 6.8 | 0.41 |
| 10 | 40 | 60 | — | 220 | 6.3 | 0.48 |
| E | — | 54 | 46 | 17.0 | 13.8 | 0.71 |

The above Lanseal backings are not bonded as well as the PVA backing, but do show superior water absorption. The examples show that the Lanseal-F fibers must be exposed to higher temperatures for longer times to obtain superior bonding.

Examples 11-15 and Comparative Examples F-H

In the following, a 52.8 mm diameter hollow mandrel was used. The overwrap tape tension was controlled to give two different normal pressures. Steam at 160° C. was run through the mandrel for various lengths of time. Under these conditions, sleeve temperatures approach 110° C. while the backing is still wet and 150° C. after the backing is dry.

| Ex. | Fiber Blend (wt. %) Lanseal | Rayon | PVA | Tape Pressure (kpa) | Steam Time (min.) | Water Absorption (% at 30 sec.) | Force at 5% Elongation (N/cm) | Apparent Density (g/cm$^3$) |
|---|---|---|---|---|---|---|---|---|
| 11 | 30 | 70 | — | 119 | 4 | 168 | 15.6 | 0.46 |
| 12 | 40 | 60 | — | 119 | 4 | 146 | 17.2 | 0.53 |
| F | — | 54 | 46 | 119 | 4 | 58 | 20.0 | 0.70 |
| G | — | 90 | 10 | 94 | 7 | 113 | 15.8 | 0.63 |
| 13 | 29 | 64 | 7 | 94 | 7 | 142 | 19.3 | 0.55 |
| 14 | 22 | 45 | 33 | 94 | 7 | 64 | 19.1 | — |
| 15 | 30 | 35 | 35 | 94 | 7 | 52 | 19.3 | — |
| H | — | 54 | 46 | 94 | 7 | 45 | 20.3 | 0.71 |

Comparative Example G and Example 13 above show the advantages of using Lanseal fibers to get increased water absorption and strength in a low-binder fiber blend. Examples 14, 15 and Comparative Example H show that the advantages obtained by incorporating Lanseal-F are reduced in a high binder blend.

Example 16

As an example of a composite formed sleeve—a 52.8 mm hollow mandrel was wrapped with three layers of an 80 g/m$^2$ basis weight web with a blend of 60%(w) Fiber 700 rayon (1.5d×38 mm), 17% VPB 101 polyvinyl alcohol fiber (1.5d×38 mm), and 23% Lanseal-F fiber (7d×56 mm) which had been wet with 1% acetic acid. One layer of a 115 g/m$^2$ basis weight web of 54% Fiber 700 rayon and 46% VPB 101 PVA was wet with 1% acetic acid and wrapped over the other web. A wet woven nylon cure tape was wrapped over these webs under sufficient tension to give a pressure of 103 kPa normal to the mandrel surface. The mandrel was heated internally for seven minutes using steam under 610 kPa pressure. After the cure tape was unwrapped, the dry sleeve was sanded with 100-grit sandpaper to remove tape marks. The sleeve was removed from the mandrel, soaked thoroughly in 0.1N aqueous ammonia, expanded to a diameter of 55.1 mm, and dried in the expanded condition. This composite sleeve had a 30-second water absorption of 93%, suitable for use as a ductor roller cover.

What is claimed is:

1. A cylindrical sleeve of non-woven web material comprising hydrophilic cellulosic fibers, polyvinyl alcohol binder fibers, and from about 10 to about 50 percent by weight of partially hydrolyzed acrylic fibers.

2. The sleeve of claim 1 wherein said partially hydrolyzed acrylic fibers are core-sheath hydrolyzed acrylic fibers.

3. The sleeve of claim 2 wherein said partially hydrolyzed acrylic fibers have a denier of from about 1 to about 9.

4. The sleeve of claim 1 wherein said cellulosic fiber is a saponified cellulose acetate fiber.

5. The sleeve of claim 1 wherein said partially hydrolyzed acrylic fibers are less than 50% by volume hydrolyzed.

6. A composite cylindrical sleeve comprised of at least one inner layer and at least one outer layer wherein said inner layer is a non-woven web material comprising hydrophilic cellulosic fibers, polyvinyl alcohol binder fibers, and from about 10 to about 50 percent by weight of partially hydrolyzed acrylic fibers.

7. The composite cylindrical sleeve of claim 6 wherein said outer layer comprises a non-woven web comprising polyvinyl alcohol.

* * * * *